(12) United States Patent
Miyake et al.

(10) Patent No.: US 6,724,502 B1
(45) Date of Patent: Apr. 20, 2004

(54) DIGITAL CAMERA AND IMAGE DISPLAYING METHOD

(75) Inventors: Izumi Miyake, Asaka (JP); Iwao Kawashima, Tokyo (JP); Takeshi Misawa, Asaka (JP); Manabu Hyodo, Asaka (JP)

(73) Assignee: Fuji Photo Film, Co., Ltd., Kanagawa (JP)

(*) Notice: Subject to any disclaimer, the term of this patent is extended or adjusted under 35 U.S.C. 154(b) by 0 days.

(21) Appl. No.: 09/577,943

(22) Filed: May 25, 2000

(30) Foreign Application Priority Data

May 25, 1999 (JP) .......................................... 11-145203
Sep. 7, 1999 (JP) .......................................... 11-253515

(51) Int. Cl.⁷ ................................................ H04N 1/04
(52) U.S. Cl. .................... 358/474; 358/473; 358/909.1; 358/482; 348/333.1; 348/207.1; 348/273; 348/252; 348/231.3; 348/207.2; 348/61
(58) Field of Search ................................ 358/474, 505, 358/1.15, 513, 1.13, 1.9, 473, 482, 483, 906, 909.1; 348/273, 252, 231.3, 61

(56) References Cited

U.S. PATENT DOCUMENTS

| | | | |
|---|---|---|---|
| 5,953,083 A | * | 9/1999 | Sharp .......................... 349/18 |
| 6,304,345 B1 | * | 10/2001 | Patton et al. ................. 358/527 |
| 6,405,222 B1 | * | 6/2002 | Kunzinger et al. .......... 707/501.1 |
| 6,519,003 B1 | * | 2/2003 | Swayze ........................ 348/375 |
| 6,538,663 B2 | * | 3/2003 | Kamei ......................... 345/635 |
| 6,552,743 B1 | * | 4/2003 | Rissman .................... 348/207.2 |
| 6,628,333 B1 | * | 9/2003 | Gowda et al. .......... 348/333.11 |
| 2002/0196345 A1 | * | 12/2002 | Young .......................... 348/207 |

FOREIGN PATENT DOCUMENTS

| | | | |
|---|---|---|---|
| JP | 89315 | 1/1996 | .......... H04N/5/765 |
| JP | 10126724 | 5/1998 | ............ H04N/5/76 |

* cited by examiner

Primary Examiner—Kimberly Williams
Assistant Examiner—Negussie Worku
(74) Attorney, Agent, or Firm—Birch, Stewart, Kolasch & Birch, LLP

(57) ABSTRACT

When images recorded in a memory card are read and reduced images of image files are displayed on a liquid crystal monitor in order, printing information of the image files is referred to. An image of which two or more prints have been designated is enclosed by a predetermined-colored (for example, yellow) frame, and a figure is displayed according the number of the prints that have been designated. An image of which any prints have not been designated is not enclosed by the frame. An image that has been printed is enclosed by an another-colored (for example, blue) frame.

20 Claims, 15 Drawing Sheets

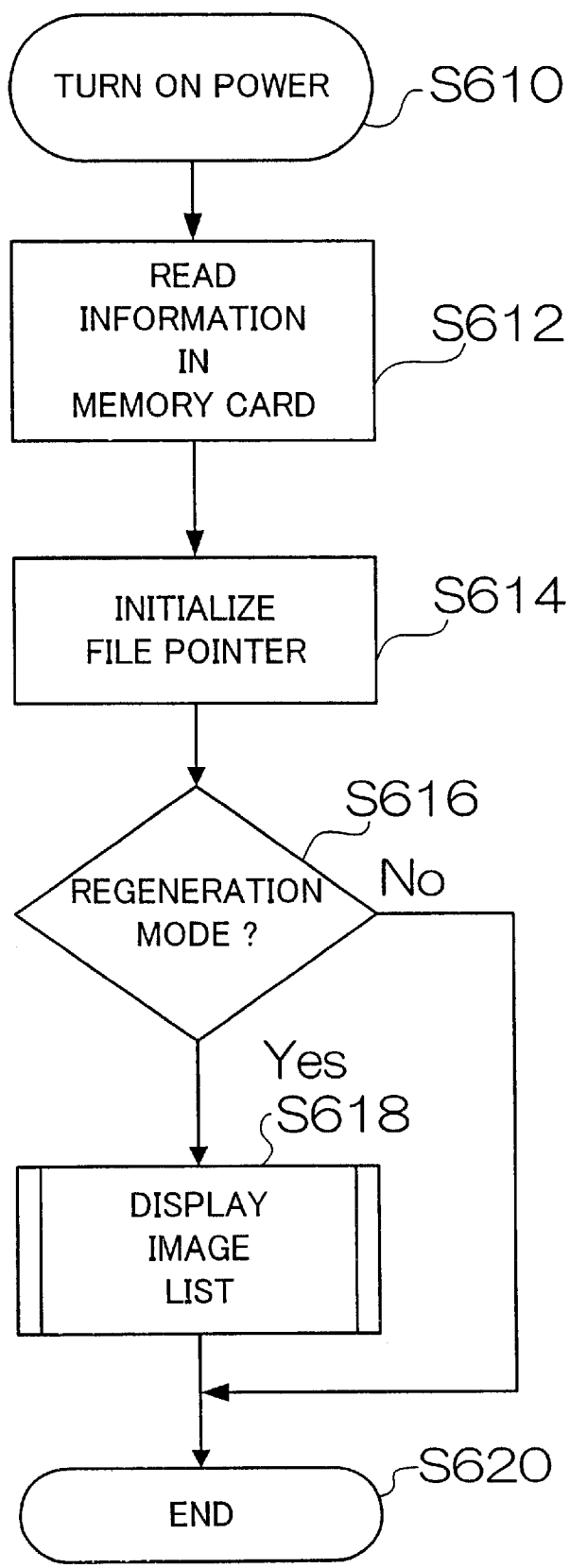
F I G. 6

F I G. 9
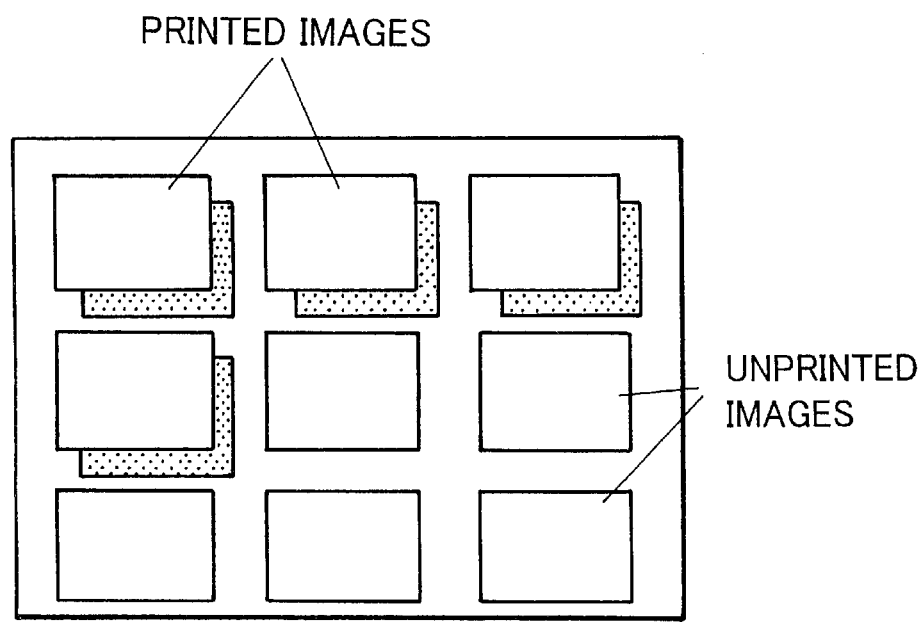

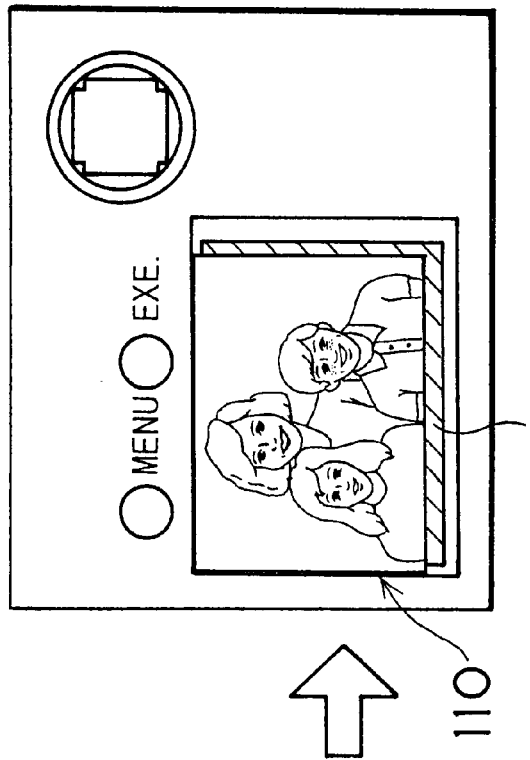
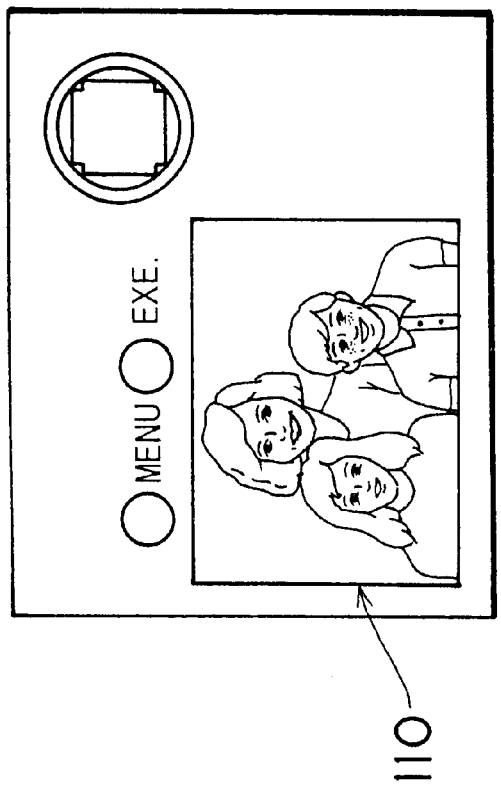

DIGITAL CAMERA AND IMAGE DISPLAYING METHOD

BACKGROUND OF THE INVENTION

1. Field of the Invention

This invention relates to a digital camera and an image displaying method. More particularly, this invention relates to printing information displaying technics in a digital camera with a print order function in which numbers of prints to be produced and the like of images obtained by shooting can be designated.

2. Description of Related Art

In a digital camera, an image obtained by shooting is recorded in a memory built in the camera or a recording medium (a removable medium) such as a detachable IC card or the like as digital image data. The recorded image can not only be displayed on a displaying device such as a liquid crystal monitor but also printed with a personal printer for domestic use or the like. The digital photo print service, for printing out images recorded in the recording medium taken by a user and providing the prints for the user, has recently started.

Japanese patent provisional publication No. 10-126724 discloses an apparatus that displays a list of digital images shot by a digital camera on a monitor for the user to designate images to be printed.

In silver halide photographing, a photo system, in which the number of prints to be produced and titles are recorded in magnetic recording layer of a photo film as magnetic information and the magnetic information is read to be used for a printing processing, has been proposed. For example, Japanese patent provisional publication No. 8-9315 discloses an apparatus that reads images recorded on a developed film having a magnetic recording layer with a line sensor and displays the film images on a monitor, and discloses a method of adding and editing print order information with reference to a list of the images in the film cartridge displayed with the apparatus.

In the conventional digital cameras, however, if print number information of the images is set, it is difficult to realize which image has been designated to be printed, and it is difficult to realize whether one print has been designated or a plurality of prints has been designated, and it is difficult to realize which image has been printed.

SUMMARY OF THE INVENTION

It is therefore an object of the present invention to provide a digital camera and an image displaying method in which it is easy to realize whether or not an image has been designated to be printed, and it is easy to realize whether or not a plurality of prints have been designated, and it is easy to realize whether or not an image has been printed.

To achieve the above object, the present invention provides a digital camera which images a subject image with an imaging device and records image data obtained by the imaging in a recording medium, the digital camera comprising: a displaying device that displays an image obtained through the imaging device or an image stored in the recording medium; a printing information adding device that adds printing information with respect to an image to be recorded in the recording medium or an image stored in the recording medium; and a display controlling device that displays the image obtained through the imaging device or the image stored in the recording medium and one or more images on a screen of the displaying device according to the printing information, the display controlling device displaying figures on the screen with respect to images that have been designated for printing according to the printing information.

According to the present invention, when the image obtained through the imaging device or the image stored in the recording medium is displayed on the screen of the displaying device, the printing information of the image is referred to, and the display is changed according to the printing information. The figures are displayed with respect to the images that have been designated for printing. Therefore, the user can easily realize whether or not the images have been designated for printing only by looking at the images on the screen.

The display controlling device displays the images that have been designated for printing with frames and/or shades, and thus the images that have been designated for printing can be differentiated from the images that have not been designated for printing.

The display controlling device cascade-displays images that have been designated for a plurality of prints as if the plurality of prints were piled up. The cascade display makes it easier for the user to realize that the images have been designated for the plurality of prints. The display controlling device displays print numbers of the images that have been designated for printing.

To achieve the above object, the present invention provides a digital camera which images a subject image with an imaging device and records image data obtained by the imaging in a recording medium, the digital camera comprising: a displaying device that displays an image obtained through the imaging device or an image stored in the recording medium; a printing information adding device that adds printing information with respect to an image to be recorded in the recording medium or an image stored in the recording medium; and a display controlling device that displays the image obtained through the imaging device or the image stored in the recording medium and one or more images on a screen of the displaying device according to the printing information, the display controlling device displaying figures on the screen with respect to images that have been printed according to the printing information.

According to the present invention, when the image obtained through the imaging device or the image stored in the recording medium is displayed on the screen of the displaying device, the printing information of the image is referred to, and the display is changed according to the printing information. The figures are displayed with respect to the images that have been printed. Therefore, the user can easily realize whether or not the images have been printed only by looking at the images on the screen.

The display controlling device displays the images that have been printed with frames and/or shades.

The figures with respect to the images that have been designated for printing and the figures with respect to the images that have been printed may be displayed on one screen so that whether or not the images have been designated for printing and whether or not the images have been printing can be realized at one time.

The digital camera may have a built-in printing device that prints the image according to the image data recorded in the recording medium. If printing is performed with the built-in printing device, printing information indicating "PRINTED" is added with respect to the image data of the printed image.

To achieve the above object, the present invention provides an image displaying method of displaying an image with printing information or an image without printing information on a monitor, the image displaying method comprising the steps of: determining whether or not the image displayed on the monitor has been designated for printing according to the printing information; and changing display of the image displayed on the monitor diagrammatically according to the result of the determination so that it can be realized whether or not the image displayed on the monitor has been designated for printing. Only an image that has been designated for printing may be displayed with a frame and/or a shade, and an image that has been designated for a plurality of prints may be cascade-displayed as if the plurality of prints were piled up.

The number of prints that have been designated is displayed with the image whose display has been diagrammatically changed. Thus, the print number can be confirmed even if the plurality of prints have been designated.

The image displaying method further comprises the steps of: adding, changing or deleting the printing information with respect to the image displayed on the monitor; and recording the printing information in the recording medium with the image.

To achieve the above object, the present invention provides an image displaying method of displaying an image with printing information or an image without printing information on a monitor, the image displaying method comprising the steps of: determining whether or not the image displayed on the monitor has been printed according to the printing information; and changing display of the image displayed on the monitor diagrammatically according to the result of the determination so that it can be realized whether or not the image displayed on the monitor has been printed. Only an image that has been printed may be displayed with a frame and/or a shade.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a flow chart showing a procedure of a processing in a regeneration mode in the digital camera according to the present invention;

FIG. 9 is a view showing display of images that have been printed in the digital camera according to the present invention;

FIGS. 13(A) and 13(B) are views showing a third display of the image displayed on the liquid crystal monitor before and after the print designation, respectively, in the digital camera according to the present invention;

DETAILED DESCRIPTION OF THE PREFERRED EMBODIMENT

This invention will be described in further detail by way of example with reference to the accompanying drawings.

Figure 1:
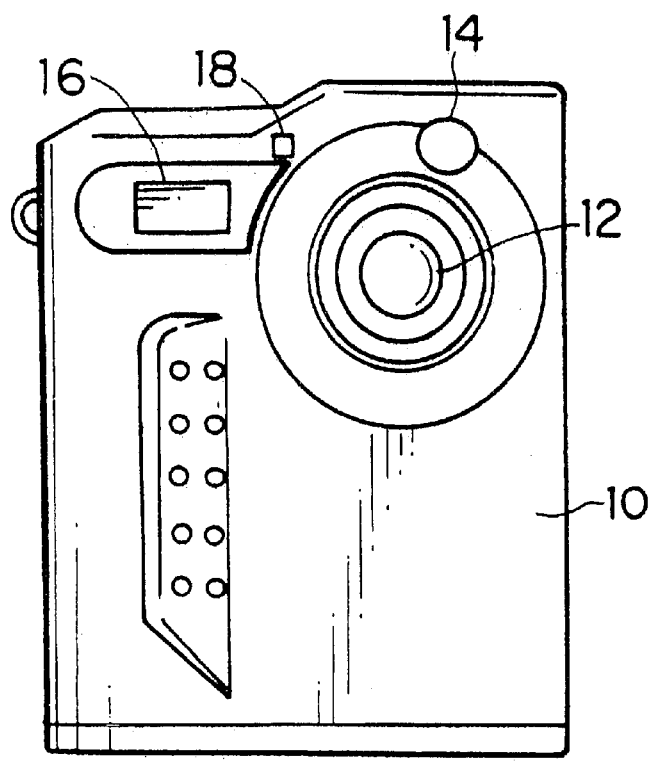
FIG. 1 is a front view showing the exterior of a digital camera according to the present invention.
Figure 2:
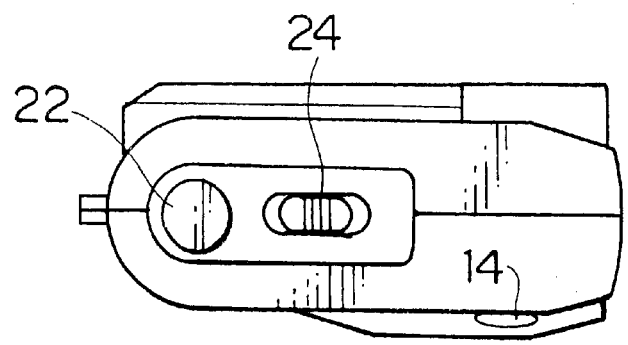
FIG. 2 is a plan view showing the exterior of the digital camera according to the present invention.
Figure 3:
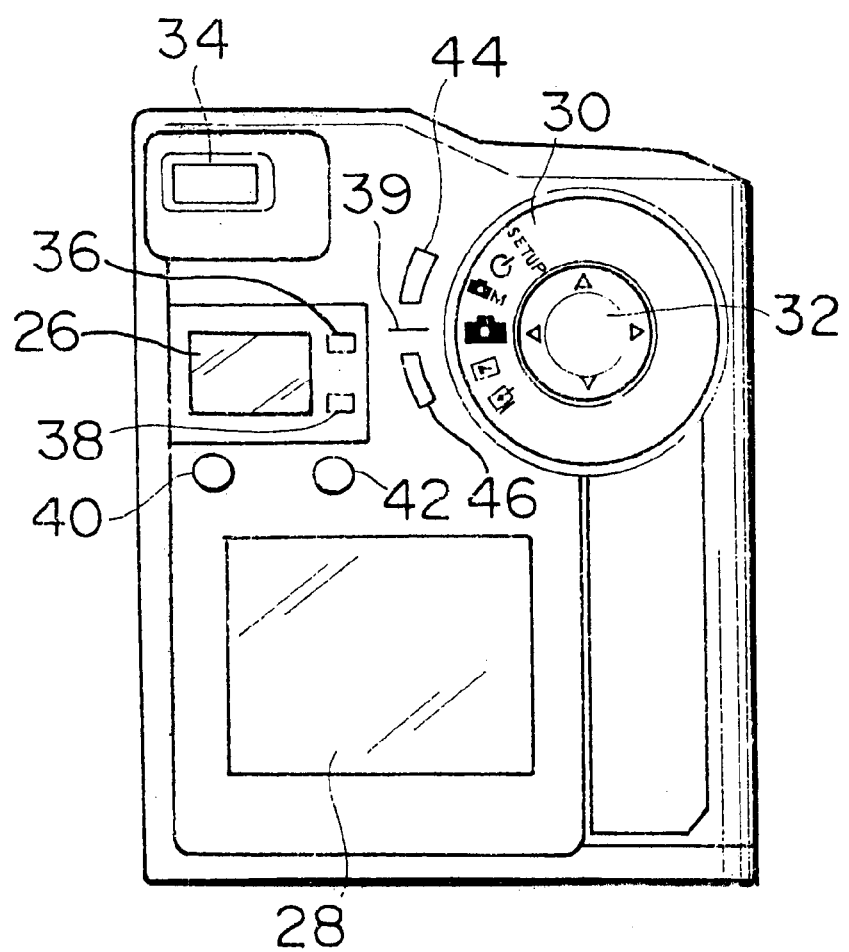
FIG. 3 is a back view showing the exterior of the digital camera according to the present invention.

FIGS. 1–3 are a front view, a plan view and a back view, respectively, showing the exterior of a digital camera 10 according to the present invention. As shown in FIG. 1, a taking lens 12, a finder window 14, a strobe 16, a strobe light control sensor 18 are provided at the front of the digital camera 10. A CCD (not shown in FIG. 1 and indicated by reference numeral 52 in FIG. 4) that is equivalent to an imaging device is arranged behind the taking lens 12.

As shown in FIG. 2, a shutter release button 22 and a power switch 24 are provided at the top of the digital camera 10. The shutter release button 22 has two positions where it is half pressed and fully pressed. When the shutter release button 22 is half pressed, an automatic focusing (AF) function and an automatic exposure control (AE) function operate to lock a focus and an exposure. When the shutter release button 22 is fully pressed, the photographing is executed.

As shown in FIG. 3, a character display liquid crystal panel 26, a liquid crystal monitor 28, a mode switch 30, a cross cursor button (up, down, left and right keys) 32, a finder 34 and the like are provided at the back of the digital camera 10. The character display liquid crystal panel 26 displays information relating to the state of the camera, photographing modes and the like. For example, the character display liquid crystal panel 26 displays the residual amount of a battery, the number of frames that may be exposed, a frame number of a regenerated image, whether the strobe should be flashed or not, a macro mode, the quality of a recorded image, and the number of pixels.

A strobe button 36 and a macro button 38 are arranged at the side of the character display liquid crystal panel 26. The strobe button 36 is operated in order to flash the strobe and prohibit the flash of the strobe according to photographic circumstances. The macro button 38 is operated to set a closerange (macro) photographing mode.

The liquid crystal monitor 28 displays images photographed through the CCD and regenerated images read from a memory card (not shown in FIG. 3 and indicated by reference numeral 64 in FIG. 4) mounted in the camera. The liquid crystal monitor 28 is used to set printing information which will be described later. A shift button 40, a display button 42, a cancel button 44, and a menu/execution button 46 are arranged above the liquid crystal monitor 28.

The mode switch 30 and the cross cursor button 32 are composed of a central button member and a ring member arranged at the circumference thereof. The mode switch 30 is capable of rotating clockwise and counterclockwise.

The mode switch 30 is used to change the functions (modes) of the camera, and the rotation of the mode switch 30 selects the mode; e.g., a photographing mode for performing the photographing and a regeneration mode for regenerating the photographed image and setting a variety of matters.

The cross cursor button 32 is tilted by pressing the top, bottom, right or left edge thereof to enter a command corresponding to one of four directions (up, down, right and left). The cross cursor button 32 is used as a control button to select and change an item from a variety of setting items such as the modes, and is used as means for giving instructions to adjust the magnification of an electric zoom, move the center of zooming and regenerate the last or next image.

Although not illustrated in FIG. 3, a holder in which the memory card 64 is mounted is provided at one side of the digital camera 10. For example, the smart medium is used as the memory card. A PC card, a flash memory card, an IC card, a floppy disk, a magneto-optical (MO) disk, a stick memory and the like may also be used as the recording medium.

The memory card 64 contains the images photographed by the CCD 52. According to the DPOF (digital print order format) standard, the digital camera 10 records the image data of each frame photographed by the CCD 52 as an image file and records printing information relating to each frame image as a printing information file (a DPOF file). The image recorded in the memory card 64 is printed with reference to the printing information. The printing information is, for example, the number of prints to be produced and the trimming of the image. The printing information relating to each frame is written in a text file format in one printing information file. In the present embodiment, the number of prints (order information) can be set as the printing information.

Figure 4:
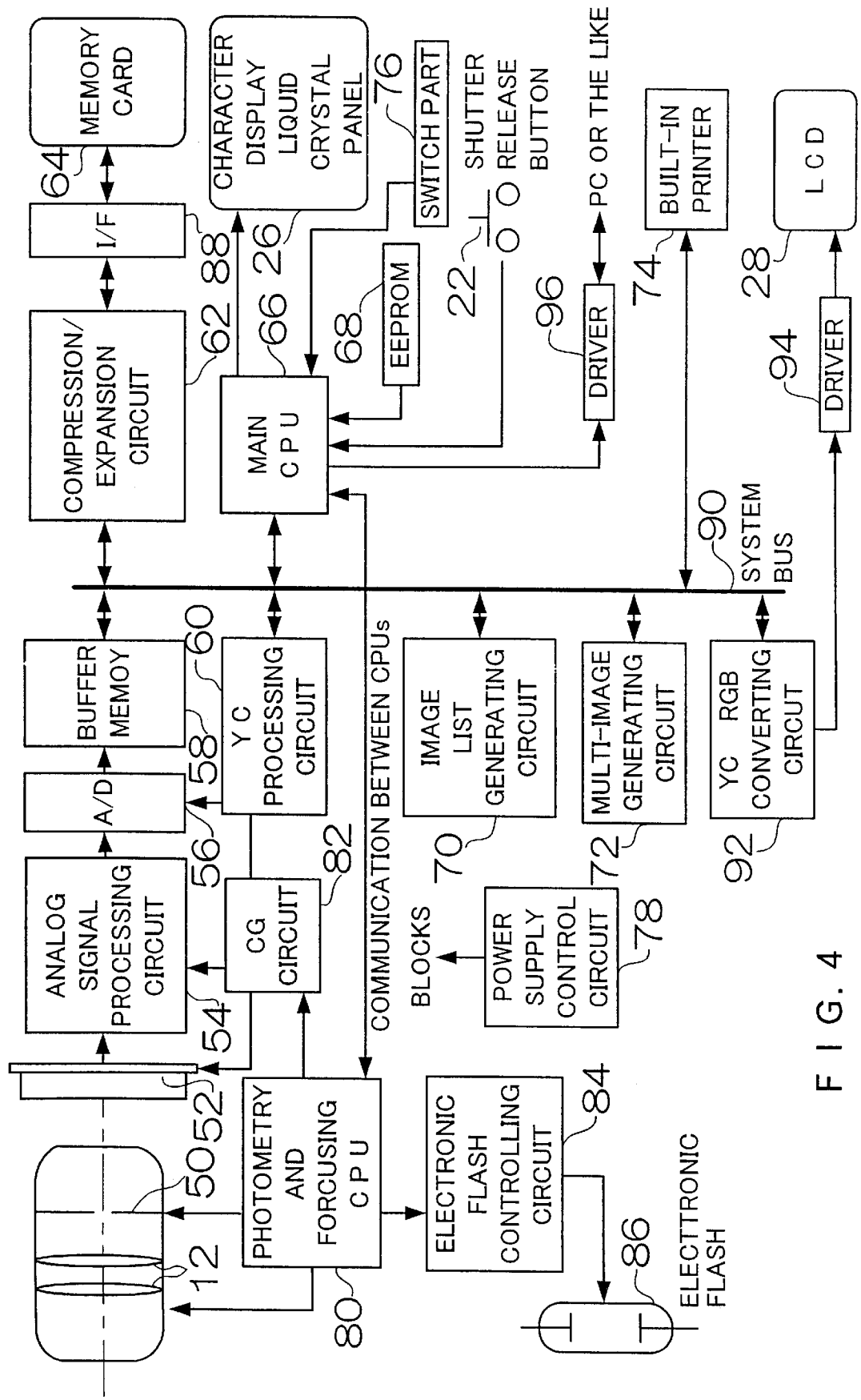
FIG. 4 is a block diagram showing the structure of the digital camera according to the present invention.

FIG. 4 is a block diagram showing the structure of the digital camera 10. The digital camera 10 is comprised mainly of the taking lens 12, a diaphragm 50, the solid state imaging device (the CCD) 52, an analog signal processing circuit 54, an A/D converter 56, a buffer memory 58, a YC processing circuit 60, a compression/expansion circuit 62, the memory card 64, a main central processing unit (CPU) 66 and the liquid crystal monitor (LCD) 28. In addition, the digital camera 10 is comprised mainly of an EEPROM 68 that stores order record information of prints, an image list generating circuit 70, a multi-image generating circuit 72 and a built-in printer (printing device) 74.

The main CPU 66 controls the circuits according to signals from switch part 76 such as the shutter release button 22, the mode switch 30 and the cross cursor button 32. When the power switch 24 is turned on, the main CPU 66 gives a command to a power supply control circuit 78 to supply power to each part of the camera from a primary or secondary battery through the power supply control circuit 78 in order to activate each circuit.

When the photographing mode is set by operating the mode switch 30 and then the shutter release button 22 is pressed, the main CPU 66 detects this and gives a command to a photometry and focusing CPU 80. The photometry and focusing CPU 80 controls the focus through a taking lens driving part, and controls the exposure by controlling electronic charge accumulation times in the diaphragm 50 and the CCD 52. A clock generating circuit 82 outputs clock pulses to the CCD 52, the analog signal processing circuit 54 and the A/D converter 56 according to the control of the photometry and focusing CPU 80 to synchronize the circuits. The taking lens 12 can be zoomed in response to a command from a zooming switch.

A light of a subject enters a light receiving surface of the CCD 52 through the taking lens 12 and the diaphragm 50, and is converted into a signal electronic charge corresponding to the quantity of light entering each sensor of the CCD 52. The signal electronic charges are sequentially read as corresponding voltage signals (image signals) according to clock pulses generated by the clock generating (CG) circuit 82. The image signals are outputted from the CCD 52 to the analog signal processing circuit 54, which performs white balance adjustment, y correction, etc. The image signals analog-processed by the analog signal processing circuit 54 are converted into digital signals by the A/D converter 56, and are temporarily stored in the buffer memory 58.

The photometry and focusing CPU 80 operates an electronic flash controlling circuit 84 when the subject is dark. The electronic flash controlling circuit 84 controls charging of a main capacitor (not shown) and discharge (light-emission) timing to a xenon tube 86.

The YC processing circuit 60 converts the image signals stored in the buffer memory 58 into a YC signal (a luminance signal Y and a chroma signal C) according to a command from the main CPU 66, and the YC signal is stored in the buffer memory 58 again. Then, the main CPU 66 sends a command to the compression/expansion circuit 62, which compresses the YC signal stored in the buffer memory 58 in a predetermined format. The compressed image data is recorded in the memory card 64 through a card interface 88.

The YC signal stored in the buffer memory 58 is supplied to a YC→RGB converting circuit 92 through a system bus 90, and is converted into R, G, B image signals by the YC→RGB converting circuit 92. The R, G, B image signals are outputted to the liquid crystal monitor 28 through an LCD driver 94. Consequently, the image photographed by the CCD 52 is displayed on the liquid crystal monitor 28 in the photographing mode. In the regeneration mode, the compression/expansion circuit 62 expands the image recorded in the memory card 64, and the image is outputted to the liquid crystal monitor 28. The regenerated image is displayed on the liquid crystal monitor 28.

A description will now be given of the display form of the printing information and methods of designating the numbers of the prints in the digital camera 10.

Figure 5:
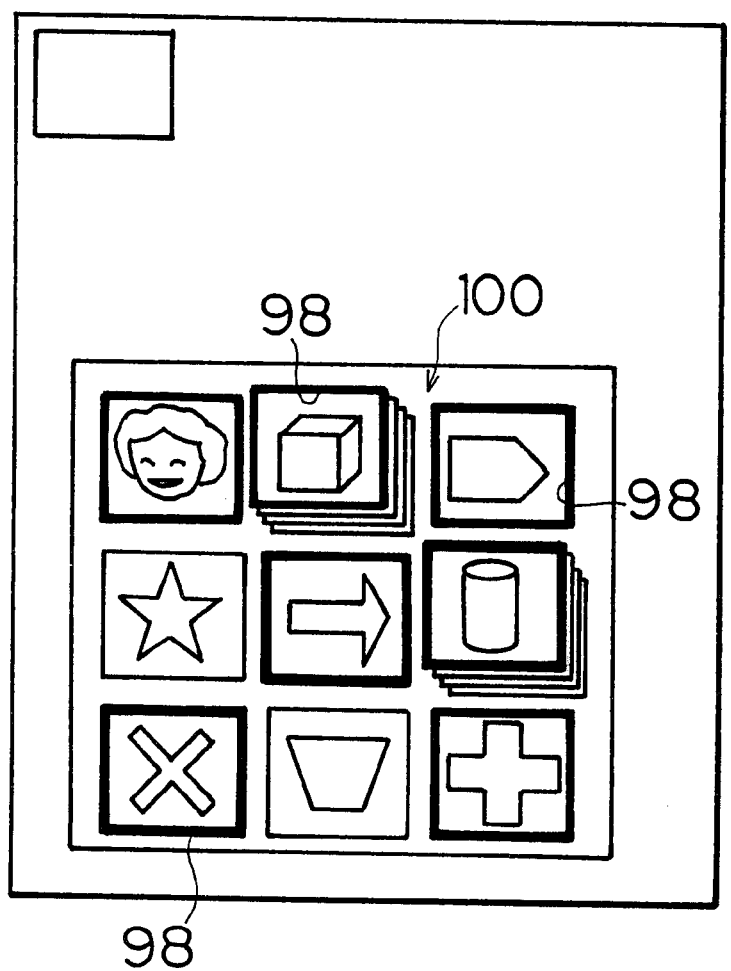
FIG. 5 is a view showing an image list in the digital camera according to the present invention.

FIG. 5 shows a list of recorded images displayed on the liquid crystal monitor 28 when the digital camera 10 is set to the regeneration mode. In FIG. 5, the liquid crystal monitor 28 is large and the mode switch 30 and the like are not shown for convenience. As shown in FIG. 5, when the digital camera 10 is set to the regeneration mode, the image files stored in the memory card 64 are read out, and the image list generating circuit 70 performs a predetermined processing, and reduced images of the image files are displayed on the liquid crystal monitor 28 in order.

Nine (3×3) images are displayed in FIG. 5, but four (2×2) images, six (3×2) images, sixteen (4×4) images or the like may be displayed, and the display form can be set according to the size of the liquid crystal monitor 28. If all the reduced images can not be displayed at one time, the reduced images are divided to be separately displayed or the reduced images are scrolled or the like.

The reduced images are displayed so that whether or not there is print order information, the number of prints that has been designated, and whether or not an image has been printed can be distinct. An image of which one print has been designated is enclosed by a predetermined-colored (for example, yellow) frame 98.

An image of which a plurality of prints has been designated is enclosed by the frame 98, and a figure showing piled-up images denoted by reference numeral 100 is displayed (cascade display) according to the number of the prints that have been designated. The cascade display makes it easier for the user to imagine, and the display data is generated by the multi-image generating circuit 72 shown in FIG. 4. In the cascade display, three types of figures may be displayed by dividing the print numbers into three levels: high, medium and low, in stead of the figures 100 indicating the precise numbers of the prints. Also, figures showing the number, arrived at by dividing the number of the prints by three, of piled-up prints may be displayed.

On the other hand, an image of which any prints have not been designated is not enclosed by the frame 98.

An image that has been printed is enclosed by an another-colored (for example, blue) frame 98. Thus, the user can realize whether or not the print number has been designated, whether a plurality of the prints has been designated and whether or not the image has been printed only by watching the list of the images. If the user selects a desired image by operating the cross cursor button 32, a print order information editing picture is displayed in stead of the image list picture. The print number can be set and changed on the print order information editing picture.

FIG. 6 is a flow chart showing the procedure of the processing of the main CPU 66 in the regeneration mode. When the power switch 24 is turned on and the processing starts (S610), the main CPU 66 reads information stored in the memory card 64 (S612). Then, the main CPU 66 initializes a file pointer that designates a file to be read (S614). For example, the file number to be designated is set at 0.

Then, the main CPU 66 determines whether or not the camera is in the regeneration mode (S616). If the mode switch 30 is not set to the regeneration mode, then the routine of the regeneration mode is stopped (S620), and the process goes to a routine corresponding to the set image.

If the mode switch 30 is set to the regeneration mode at S616, then an image list displaying processing is executed (S618). In the image list displaying processing, the reduced images of all the image files stored in the memory card 64 are simultaneously displayed on the liquid crystal monitor 28 in a predetermined display form (for example, nine 3×3 images are displayed).

Figure 7:
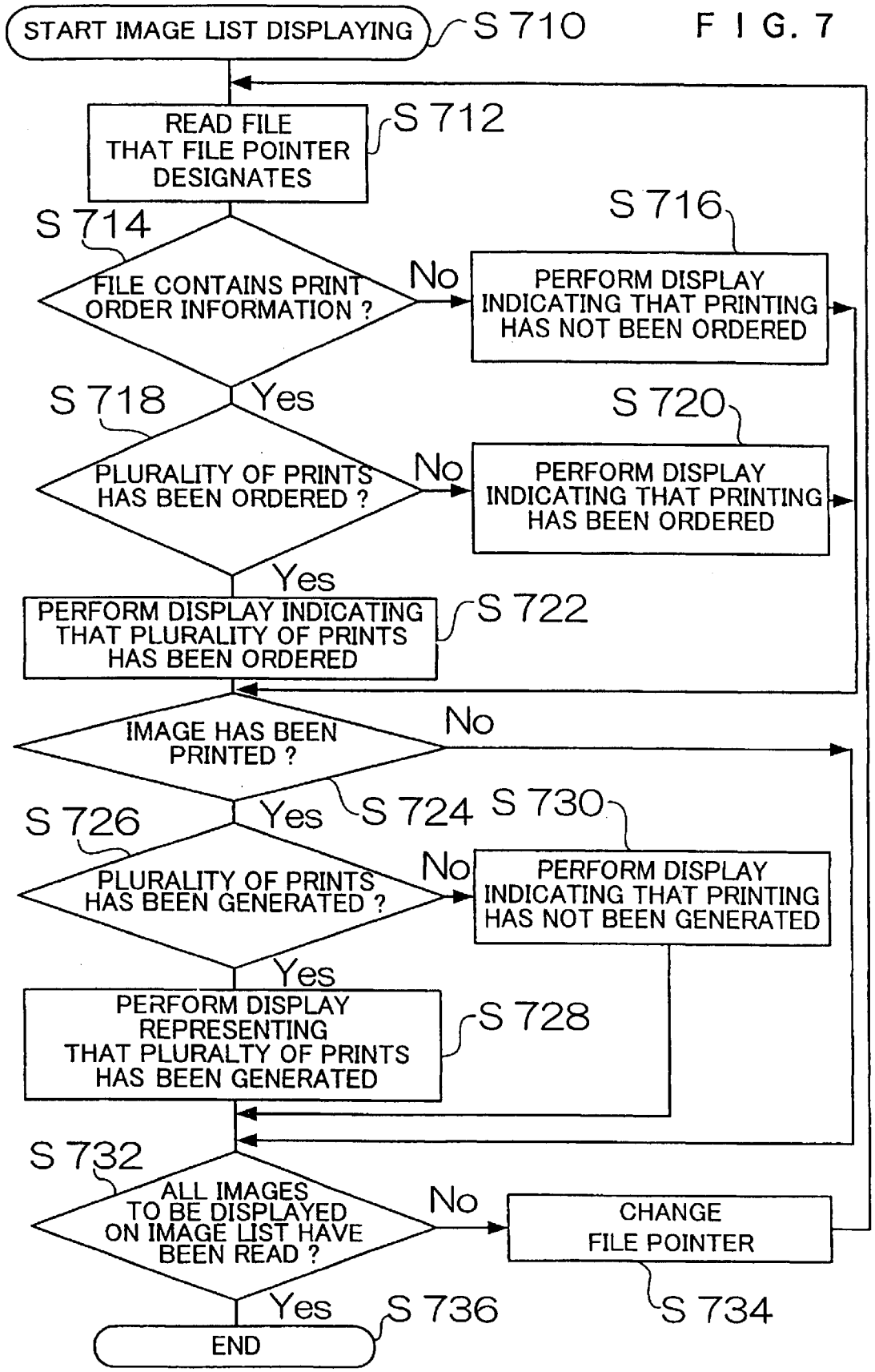
FIG. 7 is a flow chart showing a procedure of an image list displaying processing in the digital camera according to the present invention.

FIG. 7 is a flow chart showing the procedure of the image list displaying processing. When the subroutine of the image list displaying is started (S710), the file that the file pointer designates is read (S712). Since the file pointer is set at the initial value (0) at the beginning, the file whose file number is 0 is read when S714 is first arrived at.

Then, it is determined whether or not the read file contains the print order information (S714). If the read file contains the print order information, then it is determined whether or not a plurality of prints has been ordered in the order information (S718). If the plurality of prints has been ordered, a command is given to the multi-image generating circuit 72 to perform the predetermined display denoted by reference numeral 100 in FIG. 5 representing that the plurality of prints has been ordered (S722).

If the read file does not contain the print order information at S714, the predetermined display representing that the print order information has not been set (in this case, the reduced image without the frame 98) is performed (S716). If one print has been designated at S718, the predetermined display representing that one print has been designated (in this case, the reduced image with the frame 98) is performed (S720).

After S716, S720 or S722, it is determined whether or not the image has been printed (S724).

If the user takes the memory card 64 to a digital photo print service shop to order the printing, information indicating "PRINTED" is written in the memory card 64 with respect to the image files of the printed images when the memory card 64 is returned to the user. The information on whether or not the images have been printed (print record information) is also written when the images are printed with the built-in printer 74. The main CPU 66 determines whether or not the image has been printed at S724 according to the print record information. The print record information of the images read from the memory card 64 is stored in the EEPROM 68.

If the image has been printed at S724, then it is determined whether or not a plurality of prints have been generated (S726). If the plurality of prints have been generated, the predetermined display, representing that the plurality of prints have been generated (in this case, the figure denoted by reference numeral 100 and the blue frame 98), is performed (S728). Meanwhile, if one print has been generated at S726, the predetermined display representing that one print has been generated (in this case, the blue frame 98) is performed (S730). After S728 or S730, the process goes to S732. If the image has not been printed at S724, then the process goes to S732 without the display processing, only an image that has been printed is displayed with a frame and/or a shade, representing that the image has been printed.

At S732, it is determined whether or not all the images to be displayed on the image list have been read. If all the images have not been read, the file pointer is changed (S734) and the process returns to S712.

The processing (S712–S734) is repeated with respect to all the images to be displayed on the image list. When all the images have been read, the image list displaying processing is finished (S736). The image list in FIG. 5 is displayed in this way.

The procedure for setting the print numbers in the digital camera 10 will be explained.

Figure 8:
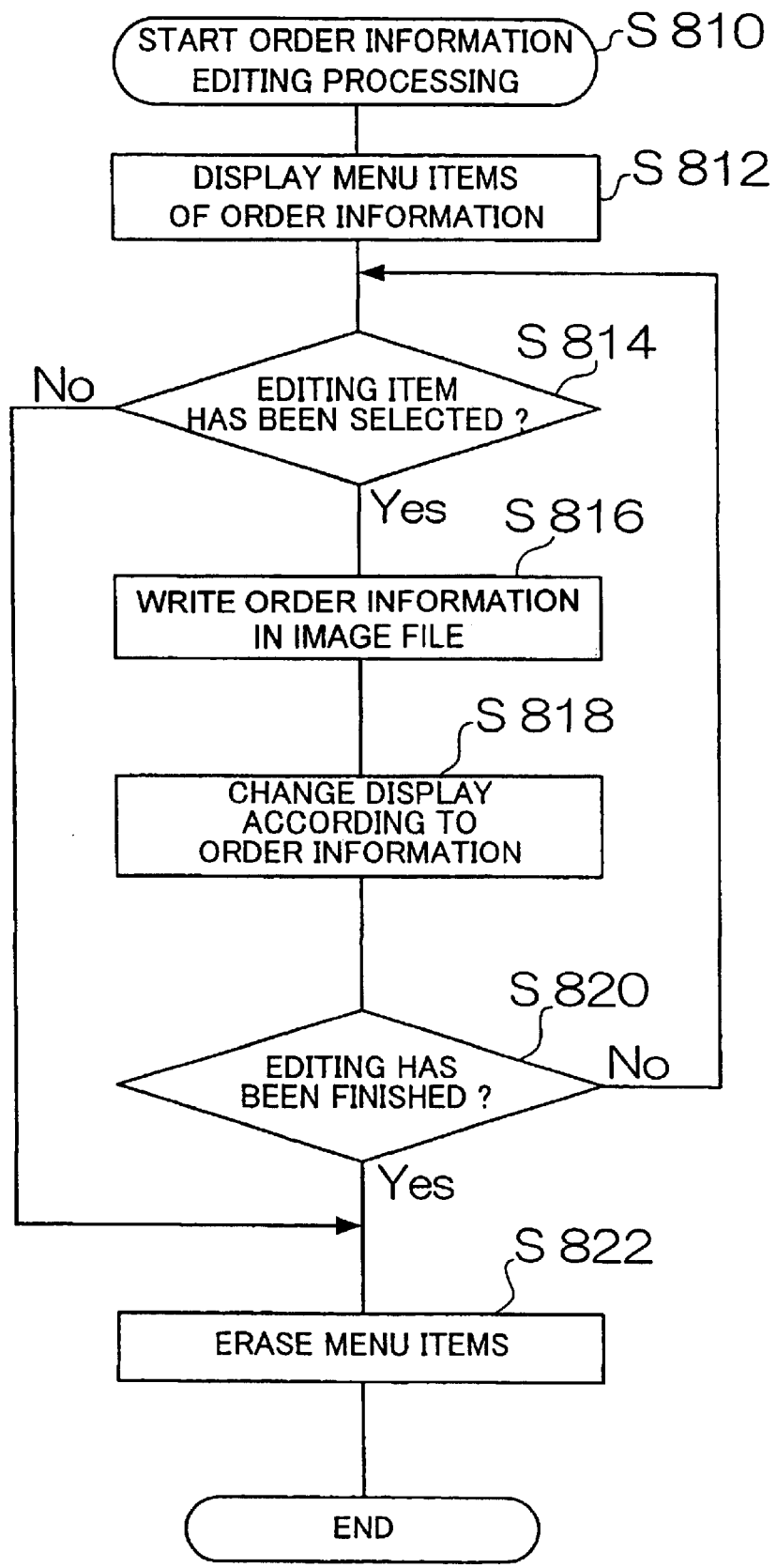
FIG. 8 is a flow chart showing a procedure of an order information editing processing in the digital camera according to the present invention.

FIG. 8 is a flow chart showing the procedure in which the main CPU 66 edits the print order information. If a desired image is selected on the picture of the image list in FIG. 5, the order information editing processing in FIG. 8 is started (S810). First, the main CPU 66 gives a command to the LCD driver 94 to display menu items of the print order information on the liquid crystal monitor 28 (S812). The user selects a desired editing item by operating the cross cursor button 32 with reference to the menu picture.

Then, it is determined whether or not the editing item has been selected by the user (S814). For example, the print number can be increased or decreased by the operation of the up or down key of the cross cursor button 32. If the user sets the print number at 0, the print designation is canceled. If the user sets the print number at 1 or more, the set number of prints are designated. If the menu/execution button 46 is pressed after the print number is set, the print number of the image is fixed. If the cancel button 44 is pressed before the menu/execution button 46 is pressed (before the print number is fixed), the set print number is canceled and the original print number is kept in effect.

After the print number is fixed, the order information, that is, the set print number is written in the image file (S816). Then, the display of the image list is changed according to the newly-set order information (S818). If the print order is canceled, the frame 98 is erased. If the print number is set at 1, the frame 98 is added. If a plurality of prints is designated, the figure denoted by the reference numeral 100 is added. After that, it is determined whether or not the editing has been finished (S820). If the editing has not been finished, the process returns to S814 to rewrite the order information of the selected image.

If the editing has been finished at S820, the order information menu items are erased (S822) to end the routine (S824). If the user does not select any editing items of the order information, the process goes to S822 and then the routine is ended.

In the present embodiment, the image list with which the user can easily realize the designation state of the print numbers and whether or not the images have been printed is automatically displayed first when the power is turned on. But the present invention is not restricted to this, and the image list in FIG. 5 may be displayed when the mode for confirming the detail of the printing information is set by the user.

The image list in which the designation state of the print numbers and whether or not the images have been printed are displayed at one time is explained. But a list picture showing the designation state of the print numbers and a list picture showing the print record may be separately constructed, and the list pictures may be switched according to the selection of the user.

FIG. 9 shows the list representing the print record. As shown in FIG. 9, shades are added to the printed images. Three types of shades with different amounts may be displayed by dividing the print numbers into three levels; high, medium and low: and the shades may be colored according to the print numbers: and the shades may be gradated. The shades are not added to the unprinted images. Since the printed images and the unprinted images are differentiated on the list picture, the user can easily realize whether or not the images have been printed only by looking at the list.

In the embodiment, the display form of the printing information and how to designate the print numbers at the multi-frame regeneration for displaying nine images at one time in the regeneration mode are explained. But the present invention is not limited to this, and the printing information may be displayed and the print numbers may be designated at the one-frame regeneration for displaying one image in the regeneration mode or on the confirmation picture of the shot image in the shooting mode.

Figure 10:
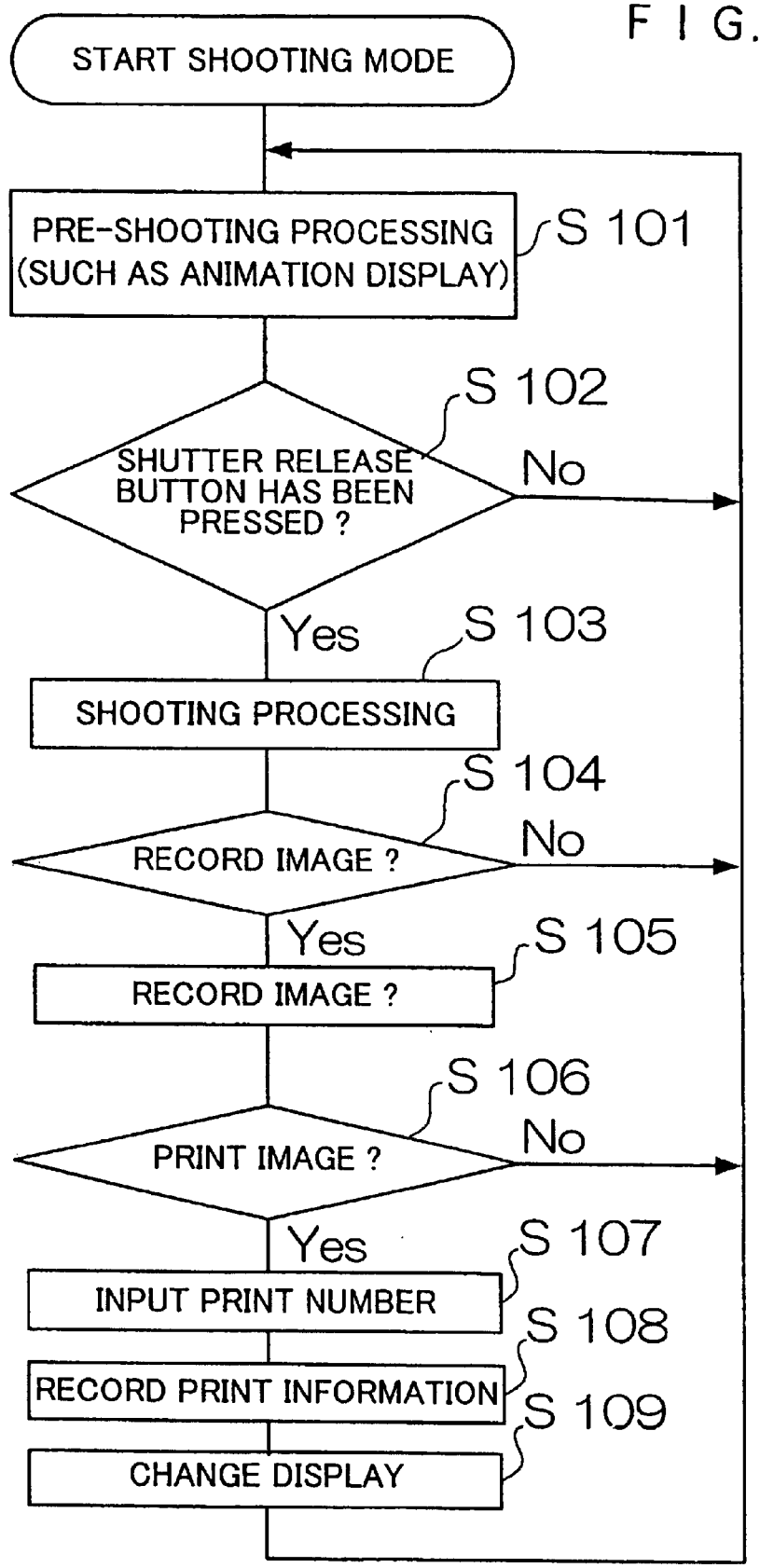
FIG. 10 is a flow chart showing an embodiment for designating prints on a confirmation picture of a shot image in a shooting mode in the digital camera according to the present invention.

FIG. 10 is a flow chart showing an embodiment for designating the prints on the confirmation picture of the shot image in the shooting mode.

As shown in FIG. 10, the pre-shooting processing such as animation display on the liquid crystal monitor is performed (S101), and the user determines the composition and so on while looking at the liquid crystal monitor. After the shutter release button is pressed (S102), the exposure control for controlling the diaphragm, the shutter speed and the like and the shooting processing such as the processing of the image signals outputted from the CCD are performed, and the shot image is displayed on the liquid crystal monitor according to the image data acquired by the shooting processing (S103).

The user determines whether to record the shot image while looking at the shot image displayed on the liquid crystal monitor (S104). If the user determines to record the shot image, then the image data of the shot image is recorded in the memory card (S105).

Then, the user determines whether to print the recorded image (S106). To print the shot image, the user inputs the print number (S107). After the print number is fixed, the printing information is recorded as additional information of the recorded image data (S108). After the print number is fixed, the display of the shot image on the liquid crystal monitor is changed (S109).

Figure 11A:
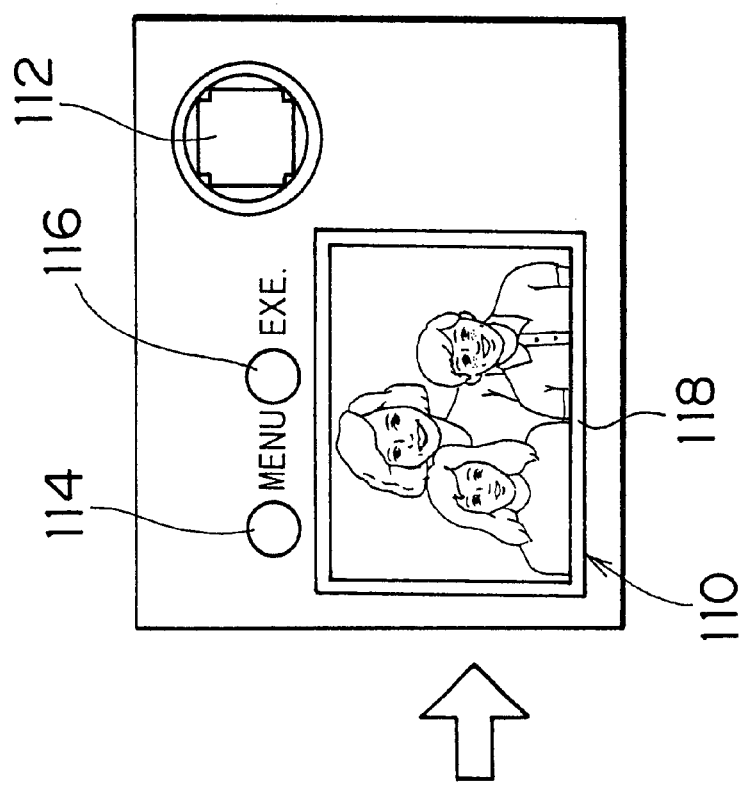
FIGS. 11(A) and 11(B) are views showing a first display of an image displayed on a liquid crystal monitor before and after a print designation, respectively, in the digital camera according to the present invention.
Figure 11B:
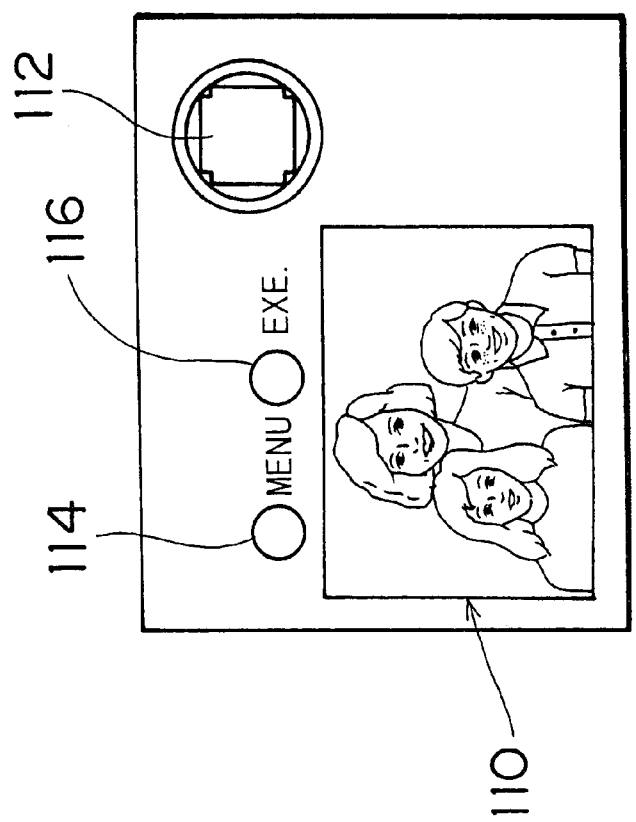

FIGS. 11(A) and 11(B) show a first display of an image displayed on the liquid crystal monitor before and after the print designation, respectively. In a digital camera in the FIGS. 11(A) and 11(B); reference numeral 110 is a liquid crystal monitor, reference numeral 112 is a cross key, reference numeral 114 is a menu key and reference numeral 116 is an execution key.

As shown in FIG. 11(B), the image to be printed is enclosed by a white frame 118. The white frame 118 can be differentiated the image from images that have not been designated for printing. Since a print of a digital image generally has a white frame, the user can easily realize that the image has been designated for printing by the white frame 118. The color of the frame is not limited to white, and it may be another color.

Figure 12:
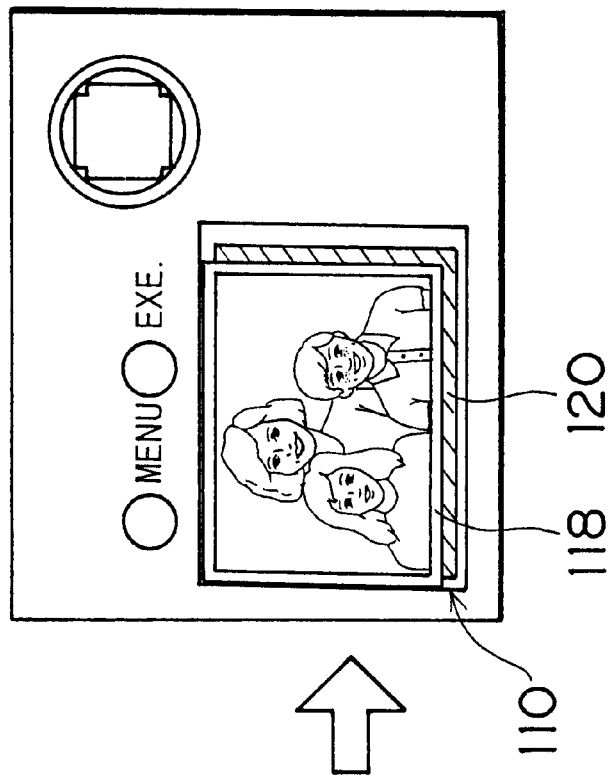
FIGS. 12(A) and 12(B) are views showing a second display of the image displayed on the liquid crystal monitor before and after the print designation, respectively, in the digital camera according to the present invention.
Figure 12:
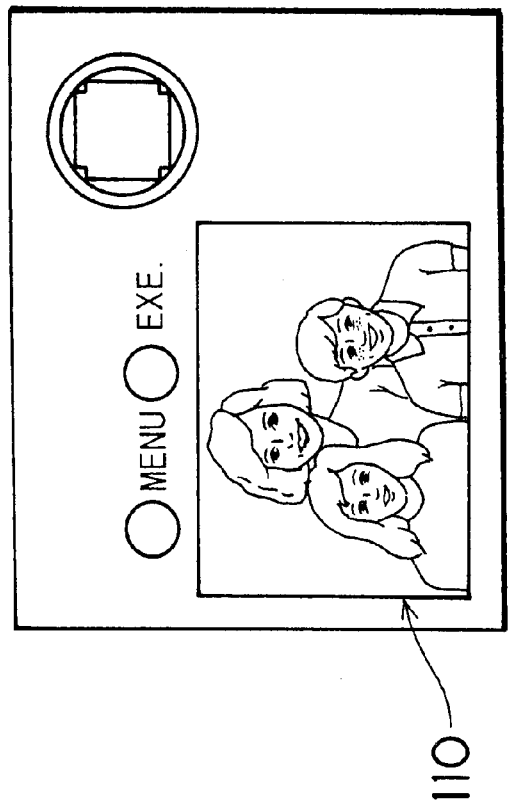

FIGS. 12(A) and 12(B) show a second display of an image displayed on the liquid crystal monitor before and after the print designation, respectively.

As shown in FIG. 12(B), the image to be printed is enclosed by the white frame 118 and a shade 120 is displayed to emphasize that the image has been designated for printing.

FIGS. 13(A) and 13(B) show a third display of an image displayed on the liquid crystal monitor before and after the print designation, respectively.

As shown in FIG. 13(B), only the shade 120 is displayed to indicate that the image has been designated for printing. The shade 120 is clear in FIG. 13(B), but its outline is preferably vague like a real shade.

FIGS. 14, 15, 16, 17 and 18 show displays when a plurality of prints have been designated.

Figure 14:
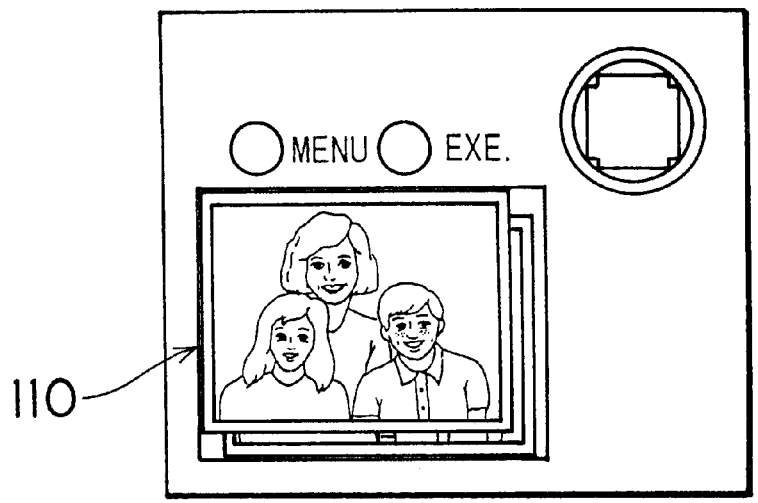
FIG. 14 is a view showing a display when a plurality of prints have been designated in the digital camera according to the present invention.
Figure 15:
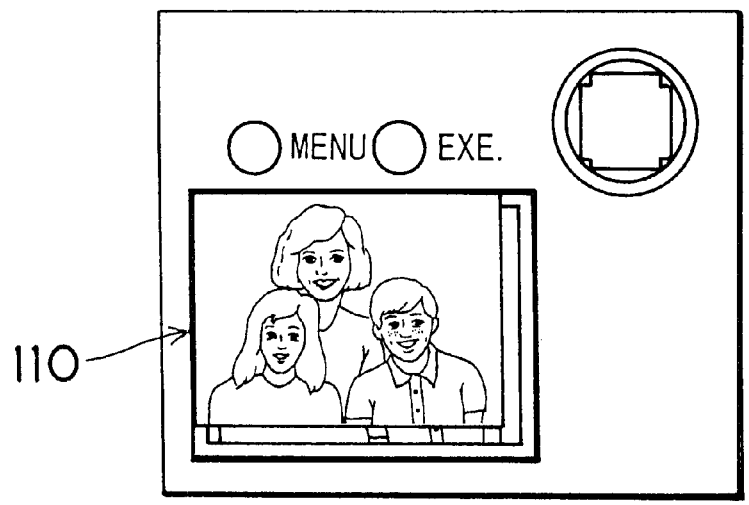
FIG. 15 is a view showing a display when a plurality of prints have been designated in the digital camera according to the present invention.

In FIG. 14, the image is cascade-displayed as if a plurality of prints with the white frames were piled up. In FIG. 15, the image is cascade-displayed as if a plurality of prints without the white frames were piled up.

Figure 16:
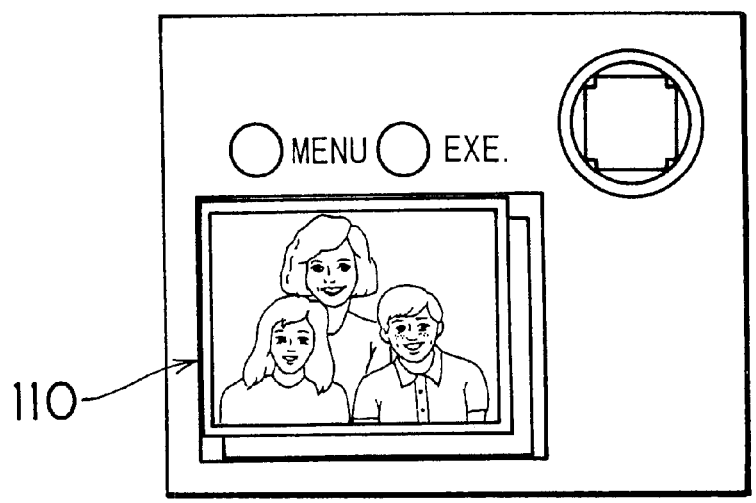
FIG. 16 is a view showing a display when a plurality of prints have been designated in the digital camera according to the present invention.
Figure 17:
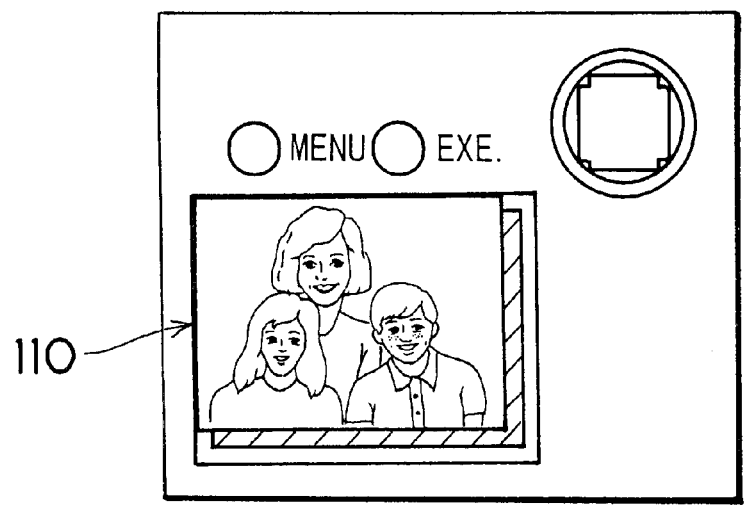
FIG. 17 is a view showing a display when a plurality of prints have been designated in the digital camera according to the present invention.

In FIGS. 14 and 15, the bottom images are displayed the same as the top images. If it is difficult to display the bottom image the same as the top image due to the performance of the digital camera and so on, the bottom image may be displayed white or another specific color as shown in FIG. 16 or 17. In this case, it is needed to differentiate the bottom image from the shade 120 in FIGS. 13 and 14.

Figure 18:
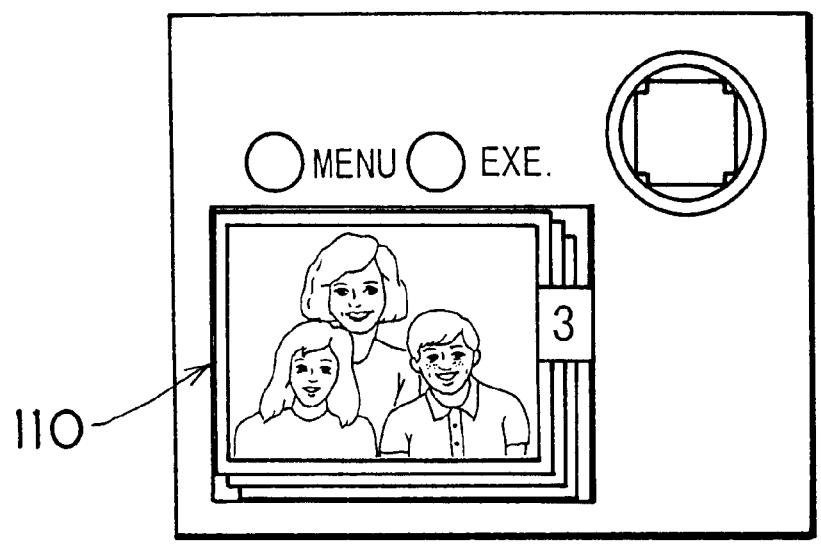
FIG. 18 is a view showing a display when a plurality of prints have been designated in the digital camera according to the present invention.

It is difficult to realize the print number if three or more images are displayed as shown in FIG. 18, though it is easy if two images are displayed. In this case the print number may be displayed as shown in FIG. 18. It is preferable to differentiate the print number from the frame number.

The images that have been designated for printing in FIGS. 11–18 may be displayed at the one-frame regenerating and multi-frame regenerating.

According to the present invention, to display an image obtained through an imaging device or an image stored in a recording medium with a displaying device, figures are displayed with respect to images that have been designated for printing and/or images that have been printed to differentiate them from the other images. Therefore, the user can easily realize whether or not the images have been designated for printing, whether or not a plurality of prints have been designated and whether or not the images have been printed only by looking at the image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera which images at least one subject image with an imaging device and records said at least one image data obtained by the imaging in a recording medium, said digital camera comprising:

a display device for displaying one of said subject image obtained from said imaging device and said at least one image data stored in said recording medium;

a printing information adding device for adding printing information corresponding to one of said at least one image data recorded in said recording medium and to an image stored in said recording medium; and a display controlling device for controlling said display device displaying the one of said image data obtained through said imaging device and said image data stored in said recording medium, and at least one image on said screen according to said printing information, and said display controlling device controlling the displaying of figures on said screen with respect to images that have been designated for printing according to said printing information.

2. The digital camera as defined in claim 1, wherein said display controlling device displays said images designated for printing with at least one of frames and shades.

3. The digital camera as defined in claim 2, wherein said display controlling device cascade-displays images designated for a plurality of prints as if the plurality of prints were piled up.

4. The digital camera as defined in claim 3, wherein said display controlling device displays print numbers of said images designated for printing.

5. The digital camera as defined in claim 1, wherein said display controlling device cascade-displays images designated for a plurality of prints as if the plurality of prints were piled up.

6. The digital camera as defined in claim 5, wherein said display controlling device displays print numbers of said images designated for printing.

7. The digital camera as defined in claim 1, wherein said display controlling a device displays print numbers of said images designated for printing.

8. The digital camera as defined in claim 1, further comprising a built-in printing device for printing said image according to said image data recorded in said recording medium.

9. A digital camera which images at least one subject image with an imaging device and records at least one image data obtained by the imaging in a recording medium, said digital camera comprising:

a display device for displaying one of an image obtained through said imaging device and an image stored in said recording medium;

a printing information adding device for adding printing information with respect to one of an image to be recorded in said recording medium and an image stored in said recording medium; and a display controlling device for displaying the one of said image obtained through said imaging device, and said image stored in said recording medium, and at least one image on a screen of said displaying device according to said printing information, and said display controlling device displaying figures on said screen with respect to images that have been printed according to said printing information.

10. The digital camera as defined in claim 9, wherein said display controlling device displays said images printed with at least one of frames and shades.

11. The digital camera as defined in claim 9, further comprising a built-in printing device for printing said image according to said image data recorded in said recording medium.

12. An image displaying method of displaying one of an image with printing information and an image without printing information on a monitor, said image displaying method comprising the steps of:

determining whether said images displayed on said monitor have been designated for printing according to said printing information; and changing display of said images displayed on said monitor diagrammatically according to a result of the determination so that it can be realized whether or not said images displayed on said monitor have been designated for printing.

13. The image displaying method as defined in claim 12, wherein only the image designated for printing is displayed with at least one of a frame and a shade.

14. The image displaying method as defined in claim 13, further comprising a step of cascade-displaying said images designated for a plurality of prints as if the plurality of prints were piled up.

15. The image displaying method as defined in claim 12, wherein said images designated for a plurality of prints is cascade-displayed as if the plurality of prints were piled up.

16. The image displaying method as defined in claim 12, wherein the number of prints designated is displayed with said image whose display has been diagrammatically changed.

17. The image displaying method as defined in claim 12, further comprising the steps of:

editing said printing information corresponding to said image displayed on the monitor; and recording said printing information in said recording medium with said image.

18. An image displaying method of displaying one of an image with printing information and an image without printing information on a monitor, said image displaying method comprising the steps of:

determining whether or not said images displayed on the monitor have been printed according to said printing information; and changing display of said images displayed on the monitor diagrammatically according to a result of the determination so that it can be realized whether or not said images displayed on the monitor has been printed.

19. The image displaying method as defined in claim 18, wherein only an image printed is displayed with at least one of a frame and a shade.

20. The image display method as defined in claim 18, wherein said images designated for a plurality of prints is cascade-displayed as if the plurality of prints were piled up.

* * * * *